INVENTORS
EDWARD T. SAYLOR, JR.
JOHN PARKINSON
BY ALFRED EIBICH

Auslander + Thomas

ATTORNEYS.

United States Patent Office 3,442,248
Patented May 6, 1969

3,442,248
MAGNETIC INDICATING DEVICE
John Parkinson, Newark, Alfred Eibich, Parsippany, N.J., and Edward T. Saylor, Jr., New York, N.Y., assignors to United Parmatic Corporation, Livingston, N.J., a corporation of New Jersey
Filed Jan. 11, 1967, Ser. No. 608,580
Int. Cl. G01l 19/12; H01f 7/02
U.S. Cl. 116—70                     11 Claims

ABSTRACT OF THE DISCLOSURE

The present invention relates to an indicating device having a single magnet to hold a magnetically attractable signal indicator until a selected amount of magnetic flux is drawn off said magnet, allowing said signal to be actuated.

---

The present invention relates to a magnetic indicating device adapted to give a signal as to the state of fluid in a fluid system.

In the past various magnetic devices have been used in connection with fluid systems to actuate a signal indicating the state of the fluid in the system.

According to the present invention a new and improved actuating means is provided employing a single magnet which may be used independently to give a signal at a selected concentration of magnetic contaminant or which may be used as part of a differential pressure indicator to respond to the selected pressure differential to give the desired warning signal.

In regard to systems wherein the fluid in a system is or must be filtered, it has been found necessary to find some simple means to ascertain when filters in such system are saturated or clogged. Failing to do this may disrupt the entire system, poison a filtered system by not preventing against filter breakdown, or may require expensive and laborious filter checking to make sure that filters are in proper working order and not clogged or saturated.

In the past it has been found advantageous to have some form of indicator associated with a fluid and filter system whereby a signal button is actuated when the differential between the fluid input pressure and the fluid outgo pressure of such system increases. Such situation usually arises as the result of filter clogging or saturation.

A usual manner of installation of such indicator has been to have a fluid input and a fluid outgo pressure inlet adapted to actuate a piston to trigger a signal when a selected differential pressure is reached.

It has been found advisable in order to avoid fluid leakage to have indicator actuation and signalling means only indirectly actuated by the fluid pressures and be outside the fluid flow or input and outgo area.

With this in mind, devices of the past have used multiple magnetic systems triggered by piston movement, the piston being moved by differential pressure actuating an indicator popout button.

Magnetic differential pressure indicators of the past have utilized such systems as having a spring loaded indicator magnetically held across a diaphragm outside said fluid system juxtaposed to a magnet on a piston within said fluid system.

In such device, north and south poles of the juxtaposed magnets would hold the indicator in place against its counterbalancing spring load. As the pressure in the fluid system rose, the piston, usually spring loaded, holding one such magnet in position, would be pushed away as the differential pressure increased, due to filter clogging or saturation. At the selected degree of differential pressure, the indicator magnet would be released and pop out under its spring tension, giving the necessary warning.

Another such variant system working on piston action with multiple magnet action obtains indicator actuation by the piston releasing the magnet indicator to be popped out as it is more strongly attracted by a second magnet as the piston magnet withdraws. A piston magnet combination has been employed actuating an indicator magnet by having a piston magnet of similar polarity repel the indicator to release the spring load and pop the indicator.

While all of these systems perform the same function, each has in common a multiple magnet system which provides an amount of magnet flux in the area of the indicator subjecting the safety device to fouling by the picking up of stray magnetically attractable particles. The indicator may also jam on reset because particles have not been completely removed.

The differential pressure indicator of the present invention has a non-magnetized popout button, which minimizes the likeliood of magnet particle fouling and yet provides a reliable index of differential pressure.

Where magnetizeable particles are likely to be contaminants in a fluid system, the single magnet indicator has both stability and sensitivity. The magnetic particle indicator may function separate and apart from the service the indicator renders to a differential pressure indicator, yet has most of the advantages of the combination device.

The single magnet in a differential pressure indicator of the present invention is located well away from the exposed portion of the indicator providing little or no magnetic flux to the exposed portion of the indicator in use. Also, the single magnet in the indicator of the present invention is easier to assemble. There is further, greater protection against the picking up of stray magnetizeable particles in assembly. The single magnet further has greater holding power against false actuation over double magnet systems of the past, for, among other reasons, that the actuating button has a small mass and is less subject to undesired inertial actuation.

The indicator of the present invention, by its simplicity of construction, may be smaller and lighter than indicators of the past. When used in hydraulic systems in aerospace applications, the small size and weight enabled by the unique construction of the indicator of the present invention presents a tremendous advantage over prior indicators.

In aerospace devices there is always a great cost for fuel necessary to lift and carry every fraction of an ounce of weight compounded by the space and weight required for the fuel itself, making the differential pressure indicator of the present invention especially valuable for application in that field.

The indicator of the present invention by its novel construction provides a great shock resistance against false actuation in its advantageous configuration. Since the individual button is firmly held by a single magnet system and the indicator has a small number of interacting parts, the magnetic indicator has a long use life and low maintenance requirement.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 2:
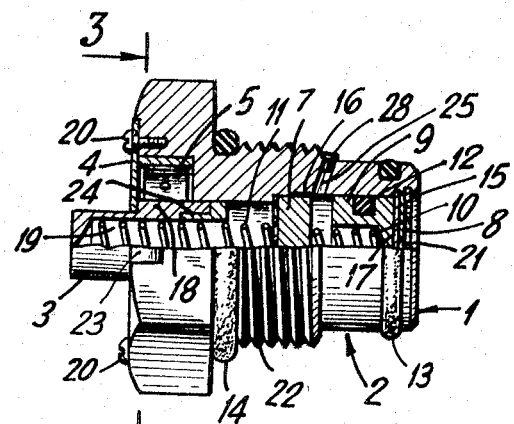
FIG. 2 is a cut-away elevation view of the differential pressure indicator of the present invention.
Figure 3:
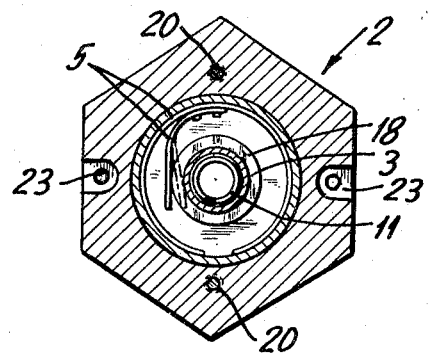
FIG. 3 is a section of FIG. 2 at lines 3–3.

In FIG. 2 the differential pressure indicator 1 of the present invention comprises a housing 2 including a popout button 3 and a cover 4 covering the top of the housing 2.

Within the upper portion of the housing 2 there may be provided a thermal assembly 5 which usually is a bimetalic element adapted to restrain button 3 actuation at the start of the use of a fluid system which, if cold, may have a high viscosity causing a differential pressure sufficient to give a false actuation of the popout button 3.

The piston 9 may be provided with an O ring 12 or some form of sealing gasket to prevent fluid leakage past the piston 9 which would interfere with the proper differential indication of the differential pressure indicator 1 of the present invention.

O rings 13, 14, serving as sealing gaskets, surround the end of the housing 2 and the portion just below the exposed portion of the housing 2. The O rings 13, 14 are to prevent leakage of fluid from its fluid system in which the differential pressure indicator 1 is placed.

It should be understood that the O rings 13, 14 are exemplary and any known sealing means may be used adapted to the needs and pressures of the fluids in the system.

The plate 8 is held in position by a retainer 15 so that the plate 8 will not disengage.

The magnet 7 is held in locked engagement 16, secure against fluid flow, to prevent any fluid flow outside the fluid inlet portion of the differential pressure indicator 1.

A filter disc 17 is interposed between the plate 8 and piston 9 to protect against the entry of particles which might damage the housing 2 or the piston 9. A filter 28 may protect the other fluid inlet.

The button 3 is preferably of aluminum, plastic or other non-magnetic substance so that it cannot carry any magnetic flux and is hollow to accommodate its popout spring 11. The button 3 has a lower portion 18 of wider diameter than the exposable portion of the button 3. This lower portion serves as a stop to keep the button 3 retained within the opening 19 of the cover 4 and also to serve as a flange to be engaged and held by the thermal assembly 5 as shown in FIG. 2 when lower temperature may increase the viscosity of the fluid creating differential pressure which would actuate the button 3 to pop out.

The cover 4 is held in place by screws 20. The cover 4 holds the indicator button 3 in place even when actuated and extending beyond the periphery of said housing 2.

The housing 2 with the magnet 7, piston 9 and fluid input pressure inlet and fluid outgo pressure inlet acts as a bicompartmented chamber.

The plate 8 acts as a retainer to maintain the piston 9 from being forced out of the housing 2 by the pressure of the expansion spring 10. The plate 8 has a fluid input pressure inlet 21 which impinges fluid input pressure upon the piston 9. The filter element 17 prevents any foreign matter entering the housing to impair the functioning of the piston 9.

The inlet 25 admits fluid from the low pressure portion of a fluid system and exerts a low pressure on the piston 9. The inlet 21 admits fluid from the high pressure portion of a fluid system and exerts a higher pressure on the piston 9 than the fluid entering the inlet 25.

By having an O ring 12 surrounding the piston 9, fluid flow past the piston 9 is stopped or inhibited to insure that the piston will be responsive to any selected pressure differential between fluid system input pressure at inlet 21 and the fluid system outgo pressure at inlet 25. Any fluid bypassing the piston 9 might destroy the differential pressure needed to actuate the piston. It is therefore necessary that the piston 9 be sealed against fluid flow as shown with O ring 12 or by other known sealing means known to the art and appropriate to seal against selected pressures and the properties of fluids employed.

The differential pressure indicator 1 may be screwed into position engaged by threads 22 using a wrench engaging the hexagonal portion of the housing 2 or where appropriate, the differential pressure indicator 1 may be fastened by screws passing through the openings 23. The O rings 13, 14 provide a packing to prevent any untoward fluid flow or leakage from the fluid system.

The button 3 is provided with a flange 24 which, as shown, is a circular flange affixed to the button 3. The configuration of the flange is not critical as long as it is small and integratable with the button 3 and preferably does not extend any great depth along the length of the button 3. The flange 24 is made of a magnetically attractable substance.

Figure 1:
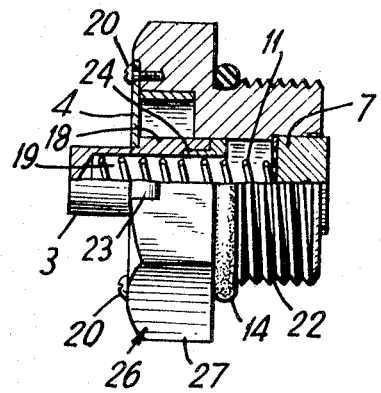
FIG. 1 is a cut-away elevation view of the indicator of the present invention.

The magnetic indicator 26 as shown in FIG. 1, while an integral part of the actuating system of the differential pressure indicator 1, also may function independently to indicate the saturation or content of magnetizeable particles in a fluid system. The body 27 of the magnetic indicator 26 must be inserted into a fluid system in an area of flow. The magnet 7 is exposed to the fluid in the system. As fluid passes the magnet 7, magnetizeable particles will be picked up.

The magnetic indicator 26 serves a double function. It collects undesirable magnetizeable contaminants from a system and further, at the selected concentration of particles gives the warning signal by drawing off sufficient magnetic flux to release the button 3.

The magnetic indicator 26 has an unusually high stability and great sensitivity to particles to actuate its signal, adapting it to a multitude of uses in fluid systems.

While the piston 9 draws off the magnetic flux to give warning as to selected differential pressures in the differential pressure indicator 1, the free magnetized particles in the fluid system provide the actuation.

In operation, the magnetic indicator 26, once actuated, may be removed and wiped clean and reinserted into place for use once proper action has been taken as indicated by the signal having been actuated.

In operation of the differential pressure indicator 1, proper adjustment and strength must be provided for the springs and magnets to obtain the optional differential pressure for actuation of the button 3 popout.

The differential pressure indicator 1 and magnetic indicator 26, once set in place, has its button 3 depressed toward the magnet 7 where the attraction of the magnet 7 is sufficient to hold the flange 24 and button 3 so that the button 3 does not protrude beyond the cover 4, held against the urging of the spring 11.

The differential pressure indicator 1 responds to the normally lower system. Fluid pressure from the fluid outgo position of the system enters the housing 2 through the inlet 25 and the fluid system's normally higher pressure fluid from the fluid input portion of the system impinges upon the piston 9, entering through the inlet 21. Since the pressure at inlet 21 is normally higher, the spring 10 must be calibrated for the normal differential pressure and to respond to the selected differential pressure.

As the fluid system in which the differential pressure indicator 1 of the present invention is engaged becomes clogged or saturated, there is an increase in the pressure differential. The pressure at inlet 21 increases and overcomes the pressure of fluid at inlet 25. When the differential at inlet 21 reaches the calibrated selected differential, the force of the pressure of fluid from the inlet 25 is overcome and the force of the spring 10 is overcome.

When such differential pressure is built up, the piston 9 is moved against the urging of the spring 10 toward the magnet 7. The piston 9 is of a magnetically attractable material also. When the piston reaches or approaches the magnet 7 under this increased differential pressure, it draws off sufficient magnetic flux such that the spring 11 overcomes the grasp that the magnet 7 has one the flange 24 and the indicator button 3 pops out.

In the magnetic indicator 26 the magnetizable particles draw off the magnetic flux, overcoming the force of the spring 11, causing the button 3 to pop out.

It is preferable that the flange 24 and piston 9 are not magnets and do not become permanently magnetized, particularly when used in the differential pressure indicator 1. The non-permanent magnetic characteristic of the piston 9 and flange 24 limit the total magnetizism of the indicators 1, 26, limiting the likelihood of the attraction of undesirable particles or the fouling of the flange 24 and the piston 9 in the differential pressure indicator 1.

Once the button 3 of the indicators 1, 26 pops out, they can be reset by depressing it again and is ready to function again once the cause of actuation has been remedied.

A clogging of the inlet 25 of the differential pressure indicator 1 does not impair the operation of the differential pressure indicator 1 of the present invention. The exact location of the inlets 21, 25 is not critical as long as they impinge on opposite sides of the piston 9 with the higher pressure entering against the pressure of the spring 10.

The terms and expressions which are employed are used as terms of description; it is recognized, though, that various modifications are possible within the scope of the invention claimed.

Having thus described certain forms of the invention in some detail, what is claimed is:

1. A magnetic indicator for a fluid system adapted to actuate a signal upon a selected change in magnetic flux comprising, a body, said body including, an indicator button, said indicator button including a first end including a magnetically attractable portion, a second portion of said indicator button adapted to extend beyond the periphery of said body, means adapted to retain said indicator button within said body, means integral to said button adapted to urge said button to extend beyond the periphery of said body, and a magnet at another end portion of said body, said magnet adapted to be in contact with said second portion of said indicator button, said magnet having insufficient magnetic flux to hold said magnetically attractable portion of said indicator button when said magnet is in contact with a selected amount of magnetically attractable particles from said fluid drawing off some of said magnet's magnetic flux and releasing said indicator button.

2. The magnetic indicator defined in claim 1 wherein said means urging said indicator button are spring means.

3. The magnetic indicator defined in claim 1 in combination with a magnetically attractable piston said piston adapted to move toward and away from said magnet responsive to fluid differential pressure.

4. The magnetic indicator defined in claim 1 wherein said second portion of said indicator button is made of a non-magnetically attractable substance.

5. The magnetic indicator defined in claim 1 adapted to be removably sealed in an opening in a fluid system in fluid tight condition.

6. The magnetic indicator defined in claim 5 wherein said indicator is threaded.

7. The magentic indicator defined in claim 5 wherein said sealing means includes a sealing gasket.

8. A differential pressure indicator for a fluid system adapted to actuate a signal upon a selected increase of differential pressure in a fluid system wherein said indicator has inlets connected to the fluid system input and the fluid system outgo comprising, a housing, said housing including a chamber portion, said chamber portion having a first end closed against the outflow of fluid, a piston movable in said chamber portion and adapted to inhibit fluid flow in said chamber past said piston, said piston including a magnetically attractable portion, a fluid system outgo pressure inlet entering into said indicator inlet, said fluid outgo pressure inlet opening into said chamber between said first end portion and one side of said piston, fluid system input pressure inlet entering into said indicator, said fluid input pressure inlet opening into said chamber on the other side of said piston, both said sides of said piston being responsive to said fluid pressures, spring means adapted to urge said piston away from said first end of said chamber, an indicator button adjacent said first end of said chamber outside of said chamber, said indicator button including a first end including a magnetically attractable portion, said magnetically attractable portion adapted to be adjacent said first end of said chamber, a second portion of said indicator button adapted to extend beyond the periphery of said housing, means adapted to retain said indicator button within said housing, means integral to said button adapted to urge, said button to extend beyond the periphery of said housing, and a magnet at said first end of said chamber, said magnet having insufficient magnetic flux to hold said magnetically attractable portion of said indicator button when said piston is moved toward said magnet drawing off some of said magnet's magnetic flux.

9. The magnetic indicator defined in claim 8 wherein said fluid input pressure inlet is connected to the input of a filter in a fluid system and the fluid outgo pressure inlet is connected to the outgo of a filter in a fluid system.

10. The magnetic indicator defined in claim 8 including a temperature responsive device adapted to prevent actuation of said indicator button at low temperature when said fluid in said fluid system is at a higher than normal viscosity.

11. The magnetic indicator defined in claim 8 including filter means adapted to filter fluid at said fluid pressure inlets.

References Cited

UNITED STATES PATENTS

| | | | |
|---|---|---|---|
| 2,704,156 | 3/1955 | Botstiber | 210—222 |
| 2,834,938 | 5/1958 | Cunningham | 324—34 |
| 2,887,230 | 5/1959 | Sicard | 210—222 |
| 3,077,854 | 2/1963 | Pall | 116—70 |
| 3,154,049 | 10/1964 | Smith et al. | 116—70 |
| 3,220,375 | 11/1965 | Gruber et al. | 116—70 |
| 3,364,897 | 1/1968 | Mouwen | 116—70 |
| 3,366,758 | 1/1968 | Bentzen et al. | 116—70 XR |
| 3,373,352 | 3/1968 | Huigens | 324—41 |

FOREIGN PATENTS 895,748  5/1962  Great Britain.

LOUIS J. CAPOZI, *Primary Examiner.*

U.S. Cl. X.R.

210—90, 222; 324—40; 335—305

UNITED STATES PATENT OFFICE
CERTIFICATE OF CORRECTION

Patent No. 3,442,248  Dated May 6, 1969

Inventor(s) John Parkinson, Alfred Eibich and Edwart T. Saylor, Jr.

It is certified that error appears in the above-identified patent and that said Letters Patent are hereby corrected as shown below:

Page 5, line 35, in Claim 1, insert and change "second" to -- first --

SIGNED AND
SEALED
AUG 18 1970

(SEAL)
Attest:

Edward M. Fletcher, Jr.
Attesting Officer

WILLIAM E. SCHUYLER, JR.
Commissioner of Patents